United States Patent [19]
Biegelsen et al.

[11] Patent Number: 6,044,717
[45] Date of Patent: Apr. 4, 2000

[54] PRESSURE AND FORCE PROFILE SENSOR AND METHOD FOR DETECTING PRESSURE

[75] Inventors: David K. Biegelsen, Portola Valley; Eric Peeters, Fremont; Warren Jackson, San Francisco, all of Calif.

[73] Assignee: Xerox Corporation, Stamford, Conn.

[21] Appl. No.: 09/161,532

[22] Filed: Sep. 28, 1998

[51] Int. Cl.[7] .............................. G03G 15/00; G01L 1/02
[52] U.S. Cl. ...................... 73/862.583; 73/725; 399/16; 399/371
[58] Field of Search .............................. 73/725, 862.046, 73/862.583; 399/371, 16

[56] References Cited

U.S. PATENT DOCUMENTS

| | | | |
|---|---|---|---|
| 4,479,392 | 10/1984 | Froeb et al. | 73/862.68 |
| 5,583,303 | 12/1996 | Franz | 73/862.046 |

OTHER PUBLICATIONS

C. F. Malacaria, *A Thin, Flexible, Matrix–Based Pressure Sensor*, Sensors, pp. 102–104, Sep. 1998.
C. Harverty et al., *Enhancing Computer Game Joysticks with Smart Force Transducers*, Sensors, pp. 92–95, Sep. 1998.

*Primary Examiner*—Joseph L. Felber
*Attorney, Agent, or Firm*—Oliff & Berridge, PLC

[57] ABSTRACT

A pressure sensor is provided which can detect the presence, absence or magnitude of pressure, as well as a pressure profile. The pressure sensor includes a sensor membrane and a sensor device. The sensor membrane is flexible and may be constructed of a conductive material or may include a flexible film attached to a conductive film. The sensor device includes a sensor strip, a voltage source, and an electrical sensor. The sensor strip includes both a conductive strip and a resistive strip. The conductive strip is arranged parallel to the resistive strip. As pressure is applied to the sensor membrane, the sensor membrane distends or deforms towards the sensor strip. As sufficient pressure is applied, the sensor membrane will make both electrical and mechanical contact with both the conductive strip and the resistive strip at a point along the length of the sensor strip. Since the sensor membrane is conductive, the conductive strip and the resistive strip will be in electrical connection with each other. As the point of application of pressure is varied, the point at which the conductive strip and the resistive strip are connected will vary. As a result, the pressure profile exerted on the sensor membrane may be determined. The pressure sensor may be utilized in a variety of environments to sense a wide variety of pressures including either fluid pressure or physical contact pressure.

28 Claims, 9 Drawing Sheets

PRESSURE AND FORCE PROFILE SENSOR AND METHOD FOR DETECTING PRESSURE

BACKGROUND OF THE INVENTION

1. Field of Invention

This invention relates to a pressure profile sensor that detects both the presence, the absence, or the magnitude of pressure or force, as well as a profile of the pressure. More specifically, this invention relates to a pressure profile sensor that senses pressure or force using thin film technology.

2. Description of Related Art

Pressure sensors are typically used to detect pressure variations in a wide variety of environments, such as pressure in working devices and Pressure in living environments, for example. Also, pressure sensors are used to detect pressure variations of a wide variety of mediums. For example, the pressure exerted by a fluid may be sensed. The fluid may be air or water, for example. One illustrative example of an apparatus that senses fluid pressure is a conventional air pressure gauge. Such conventional air pressure gauges commonly include a movable member that moves in proportion to an amount of air pressure exerted by an air pressure source. Also, conventional air pressure gauges commonly include a measuring or indicating member. The measuring or indicating member provides an indication of the amount of movement of the movable member. As a result, the measuring or indicating member provides an indication of the amount of pressure exerted on the movable member.

An additional illustrative example of an apparatus that senses a mechanical contact pressure is a conventional touch keyboard. Such a conventional touch keyboard is used in various devices to input information including a computer keyboard and a touch tone phone, for example. Such devices include numerous keys which must sense the application of a physical pressure. When a user exerts a physical pressure on one of the keys, an indication is generated that the user has selected that specific key.

SUMMARY OF THE INVENTION

However, these and other conventional devices for sensing either fluid or physical pressure are subject to various disadvantages. One disadvantage is that such conventional pressure sensors merely measure a magnitude of pressure. Illustratively, a conventional air pressure gauge may be positioned in an interior area of an apparatus to measure an interior pressure of the apparatus. The conventional air pressure gauge will merely reflect the magnitude of the greatest pressure sensed in that interior area. The conventional air pressure gauge will not provide an indication of whether there are variations of the pressure in the interior area. Nor will the conventional air pressure gauge provide an indication of whether the pressure sensed is a low pressure in the interior area.

This invention provides a pressure profile sensor for sensing the presence, the absence, or the magnitude of pressure, as well as a pressure profile.

The pressure profile sensor according to this invention is versatile and widely adaptable to a variety of situations and environments in which the determination of pressure or a pressure profile exerted by a fluid or by physical contact is desirable.

This invention separately provides a pressure sensor that can effectively sense the profile of a variety of types of fluid pressure, contact pressure, or spatial pressure/force distributions.

This invention separately provides a pressure sensor that is compact and can be positioned in a variety of sections or areas within a device in which it is necessary to determine the presence, the absence, or the magnitude of pressure, or an exertion of force resulting in pressure, or a pressure profile.

In accordance with the invention, in one preferred embodiment, a pressure sensor is provided which includes a sensor membrane which is integrated with a sensor device. The sensor membrane is conductive. The sensor membrane may be formed of a single unitary conductive material. Alternatively, the sensor membrane may be formed of a flexible film such as silicone and a conductive film such as aluminized mylar. The flexible film is attached to the conductive film, for example, by a lamination process. The sensor membrane is constructed of flexible or resilient material that will deform or bend in response to a pressure exerted on the sensor membrane. When no pressure is exerted on the sensor membrane, the sensor membrane will be in an undeformed position, hereinafter referred to as a rest position.

In some preferred embodiments of the invention, a sensing channel is arranged such that the sensor membrane forms one wall of the sensing channel. Further, the sensing channel defines a sensing space. The sensor membrane comprises a sensing area. The sensing area is a portion of the sensor membrane which extends over the sensing space. The sensor membrane is resiliently deformable or bendable into the sensing space of the sensing channel.

The pressure sensor in accordance with the invention also includes a sensor device arranged adjacent to the sensor membrane. Each sensor device may include a sensor strip, a voltage source, and an electrical sensor. Alternatively, the sensor device may include a current source. Further, in some preferred embodiments, the sensor strip includes both a conductive strip and a resistive strip. The resistive strip and the conductive strip are positioned in the sensing channel. The resistive strip and the conductive strip are arranged parallel to each other. The voltage source is electrically connected to the conductive strip at a point along the length of the conductive strip. The specific point of application of the voltage or current source will depend on the particular use of the pressure sensor, as described below. Further, a plurality of sensor strips may be arranged in a variety of geometrical arrangements, including one-dimensional and two-dimensional arrangements, depending on the particular application of the pressure sensor.

When no pressure is exerted on the sensor membrane, the sensor membrane is positioned in the rest position. However, when pressure is applied to the sensor membrane, the sensor membrane yields to the pressure and deforms or distends towards the sensor strip. As a certain threshold deformation is attained as a result of a threshold pressure being exerted along at least some portion of the sensing area, the sensor membrane will deform and contact both the conductive strip and the resistive strip. The conductive sensor membrane thus electrically connects the conductive strip to the resistive strip. As the point of application of the pressure applied to the sensing area varies, the point along the sensor strip at which the conductive sensor membrane contacts the sensor strip will vary.

Since the sensor membrane is conductive, the sensor membrane provides an electrical connection between the conductive strip and the resistive strip at the point of contact between the conductive sensor membrane and the sensor strip. The current from a constant current source thus passes from the conductive strip to the resistive strip. Once current is conducted to the resistive strip, the current passes through the resistive strip to a ground end of the resistive strip. The electrical sensor may be a differential amplifier, for example, electrically connected to both the conductive strip and the ground end of the resistive strip.

As the current passes from the contact point, i.e., the point at which the conductive sensor membrane contacts to the sensor strip, to the ground end of the resistive strip, the current will experience a voltage drop. The specific voltage drop is dependent upon the distance the current travels through the resistive strip and the resistance of the resistive strip. When using a current source, the voltage difference across the inputs of the amplifier is thus I * r, where I is the fixed current from the current source and r is the resistance of the non-shorted segment of the resistive strip. The output of the amplifier is a voltage $V_o$, which is related to the input voltage difference by the voltage gain (G) of the amplifier. Thus, $V_o = G * I * r$.

The distance the current travels is dependent upon the contact point of the conductive sensor membrane upon the sensor strip. The electrical sensor provides an indication of the voltage drop experienced as the current passes through the conductive strip. As a result, the electrical sensor is capable of providing an indication of the location of the contact point.

Alternatively, in other preferred embodiments, the conductive member may be connected to a voltage source (V) and the resistive strip connected to a current transconductance amplifier, for example, which would hold the end of the strip at virtual ground and measure the current flowing to ground. The current flowing through to ground is related to the resistance of the resistive strip r in the portion of the resistive strip between the contact point and the ground. Therefore, by measuring the current flowing to ground, the spatial location of the contact point can be determined.

Since the contact point is dependent upon the pressure exerted on the sensor membrane, the electrical sensor is capable of providing an indication of the profile of the pressure exerted on the sensor membrane. That is, the degree of deformation of the sensor membrane at each point is dependent on the pressure applied to the sensor membrane at that point. As a result, the pressure applied to the sensor membrane, as well as the specific point of application of the pressure, may be determined based on the contact point of the sensor membrane with the sensor strip including the conductive strip and the resistive strip. As additional pressure is applied to the sensor membrane or as the point of application of the pressure varies, the deformation of the sensor membrane changes to vary the contact point of the sensor membrane on the sensor strip.

The pressure sensor according to this invention has a wide variety of applications in a wide variety of environments. Illustratively, one particular application of the pressure sensor in accordance with the invention is to perform as a sensor to detect the presence, the absence, and/or the position of an object. Specifically, the pressure sensor may be used in conjunction with a fluid flow source to detect the position, presence or absence of the object. The pressure sensor may be positioned opposite to the fluid flow source and positioned adjacent to an object passage through which the object passes or adjacent to an area or section of a device in which the object is positioned. As the object moves through the object passage, the object moves between the fluid flow source and the pressure sensor. As a result, the object will obstruct or impede the fluid flow source impacting on the pressure sensor to vary the pressure exerted on the pressure sensor and the position at which the pressure is exerted on the pressure sensor. The pressure sensor outputs a signal indicative of this variance in the pressure and the profile of the pressure.

One illustrative example of an apparatus in which a pressure sensor may be used, in accordance with the invention, is to detect an object's position in a photocopy device. For example, the pressure sensor may be used to detect the position of a sheet of paper. Typically, in a photocopy device, multiple paper sheets are stored in a paper storage bin. Upon initiating a copying process, a sheet is transported from the paper storage bin through various paths in the photocopy device. For example, the sheet is transported via a specified path to an area in which an image is reproduced on the paper, i.e., an image forming engine. Thereafter, the sheet is transported via additional paths to a recovery bin from which the sheet can be retrieved.

It is integral to the operation of the photocopier that the position of each paper sheet be monitored as it passes through the various paths. Accordingly, the pressure sensor of this invention may be positioned in at least one of the paths of the photocopy device in conjunction with a fluid flow source. As the paper sheet moves through the path of the photocopy device, the paper sheet will, at a certain point, move between the fluid flow source and the pressure sensor. As a result, the paper sheet will obstruct or impede the fluid flow impacting on the pressure sensor to vary the pressure and the pressure profile on the pressure sensor. Accordingly, the pressure sensor outputs a signal indicative of the presence, arrival, departure and/or position of the paper sheet.

Specifically, in accordance with this invention, the pressure sensor used to detect the presence, arrival, departure and/or position of the paper sheet in a photocopy device includes the sensor membrane and the sensor device described above. In some preferred embodiments of the invention, the sensor membrane is positioned in a rest position when no fluid flow is exerted on the sensor membrane. In the rest position, the sensor membrane is spaced a distance from the sensor strip. In operation a fluid flow source is directed at the sensor membrane. Further, when a sheet of paper, for example, is not positioned between the fluid flow source and the pressure sensor, i.e., the paper sheet has not yet arrived, the unimpeded fluid flow passing from the fluid flow source impacts on and distends, i.e., deforms, the sensor membrane with a certain force.

Due to this deformation of the sensor membrane, the sensor membrane makes both mechanical, i.e., physical, and electrical contact with the sensor strip along the entire length of the sensor strip (when a paper sheet is not present). However, when a paper sheet arrives at a position between the fluid flow source and the pressure sensor, the fluid flow will be decreased along at least a portion of the sensor strip. Accordingly, at least part of the sensor membrane will move towards the rest position away from the sensor strip. As the position of the sensor membrane changes, mechanical and electrical contact between the sensor membrane and both the conductive strip and the resistive strip will vary. As a result, the presence, arrival, departure and/or position of the paper sheet in the path of a photocopy device may be determined.

Accordingly, the pressure sensor is versatile and widely adaptable to a variety of situations in which it is necessary or desirable to detect the position, presence, and/or absence of an object in a section or area of a device. The pressure sensor is also usable as an object sensor that is compact and can be positioned in a variety of sections or areas within the device in which it is necessary or desirable to determine the position of the object. However, it should be understood that the above description, illustrating use of the pressure sensor of the invention as an object sensor, is merely one of numerous potential applications of the pressure sensor of this invention. The pressure sensor may be used anywhere it is necessary or desirable to detect the presence, the absence, and/or the magnitude of pressure. Further, the pressure sensor may be used to detect a pressure profile in a wide variety of applications.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
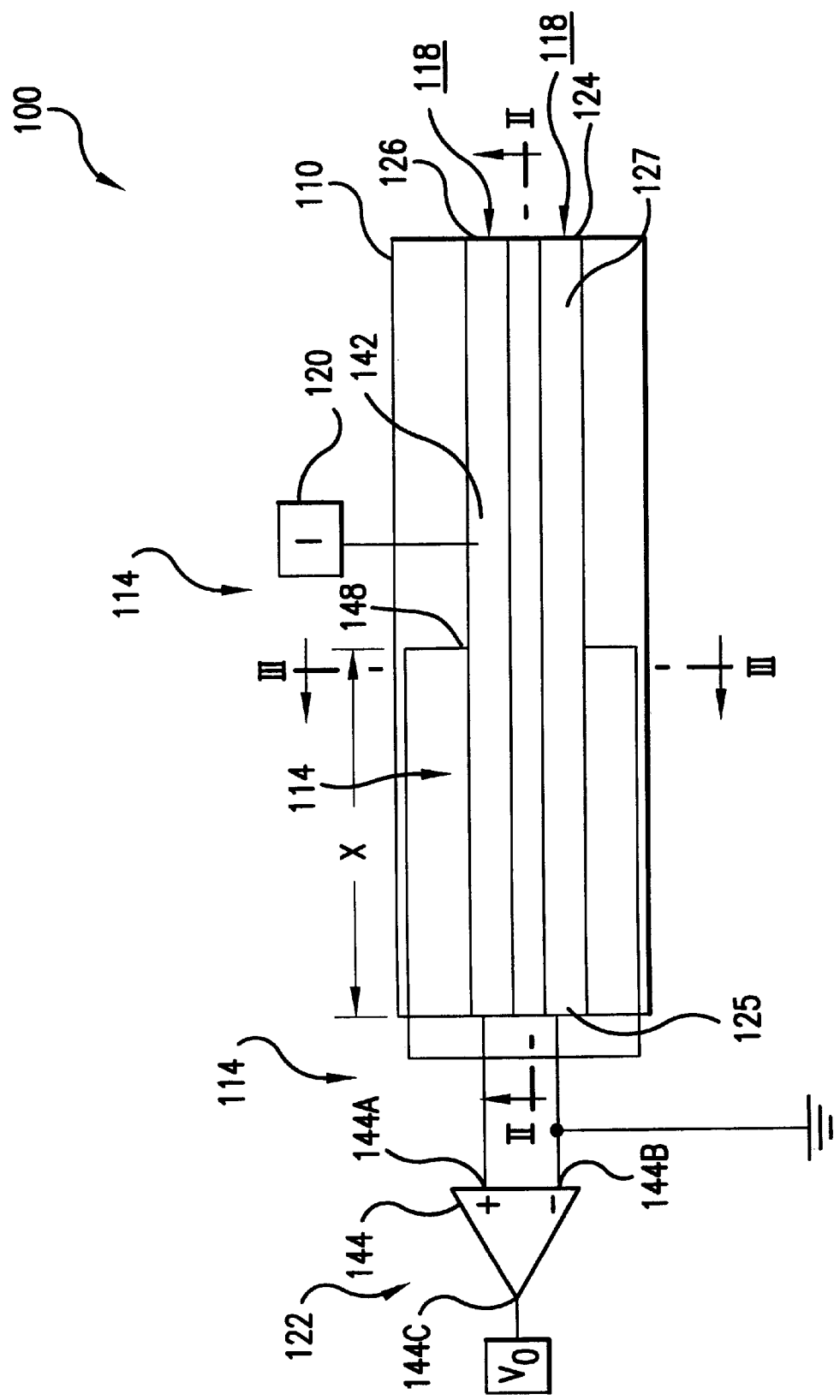
FIG. 1 is a top plan view of a pressure sensor utilizing a current source in accordance with this invention.

The pressure sensor in accordance with this invention may be positioned in any device in which it is necessary or desirable to detect the presence, the absence, or the magnitude of pressure, or a pressure profile. Further, the pressure sensor according to this invention can be provided in any device in which it is necessary or desirable to measure a pressure and in which the pressure may be exerted to deform a sensor membrane of the pressure sensor. For example, the pressure sensor may be used in any device in which a fluid flow may be directed against a sensor membrane, or a physical pressure may be applied to the sensor membrane and where a determination of the particular point of application of the pressure is desirable.

For example, the pressure sensor of the invention can be used as an object sensor in conjunction with a fluid flow source to variably impact on and deform the sensor membrane depending on the position, presence and/or absence of an object. Alternatively, the pressure sensor may detect contact pressure generated by physical contact, such as a fingertip depressing a touch screen. The pressure sensor can provide an indication of the fingertip on the touch screen. As outlined above, the pressure sensor can be used anywhere the presence or magnitude of pressure needs to be determined, so long as the pressure sensor can be exposed to the pressure to be determined.

As noted above, one particular application of the pressure sensor of the invention is to be used in conjunction with fluid pressure. It should be appreciated that any known or later developed fluid can be used in conjunction with the pressure sensor in accordance with the invention. The only limitation on the fluid is that the fluid cannot damage or pollute either the pressure sensor or any of the surrounding elements of the device in which the pressure sensor is located or that device's environment. Furthermore, in some embodiments of the invention, the fluid should be electrically insulating.

It should further be appreciated that the pressure sensor according to this invention can be used as an object sensor to sense the position, or the presence or absence of any type of object that can be transported through an object passage, described below, to obstruct, block or occlude the fluid flow across the object passage. Thus, so long as the fluid flow is sufficiently altered by the object traveling through the object passage such that the altered fluid flow profile can be sensed by the pressure sensor, the position and/or the presence or absence of any object can be sensed by the pressure sensor and pressure sensing method according to this invention.

In the following exemplary description of embodiments of the pressure sensor and pressure sensing method according to this invention, the fluid used to determine the position, presence or absence of an object is air. However, as set forth above, it should be appreciated that the sensor and sensing method according to this invention are not limited to using air as the sensed fluid. Similarly, in the following exemplary description of some embodiments of the pressure sensor and sensing method according to this invention, the object is a paper sheet and the pressure sensor is positioned within an image forming device, such as a printer, a photocopier, a facsimile or the like. However, as set forth above, it should be appreciated that the pressure sensor and sensing method of this invention are not limited to sensing paper or being positioned in or used with an image forming device.

Thus, the fluid used in conjunction with the pressure sensor of the invention could be a gas other than air, such as any gaseous-state element, like oxygen, nitrogen, helium, hydrogen, neon, argon or the like, any gaseous-state molecular compound or mixture, like carbon dioxide, steam, methane or other gaseous hydrocarbon or hydrocarbon vapors, an organic gas, such as ether, or the like. Similarly, the fluid could be a liquid, such as any liquid-state element, like sulfur, any liquid-state molecule, compound or mixture, like water, any liquid hydrocarbon, such as mineral or vegetable oil, any organic liquid, such as acetone or formaldehyde, or the like. However, in some embodiments, the fluid should be electrically insulating. Those skilled in the art will appreciate that the appropriate fluid to be used in a particular embodiment of the pressure sensor and sensing method according to this invention will depend on the pressure sensing environment, fluid sensing device, object to be sensed and the like.

Additionally, the pressure sensor in accordance with this invention may be used in conjunction with or in any of the devices or methods disclosed in co-pending U.S. patent applications Ser. No. 09/161,534 (Attorney Docket No. 100131) and Ser. No. 09/161,533 (Attorney Docket No. 100132) filed herewith and incorporated by reference in their entirety.

As described above, one particular application of the pressure sensor of the invention is to sense objects. Some examples of objects to be sensed include paper and other recording media, sheet-like materials, such as paper webs, sheet metals, green ceramics, uncured rubber sheets, ribbons, and the like, and even screen-like materials and other objects having holes or passages through which the fluid could flow, if the material or object is nonetheless able to sufficiently disturb, reduce or block the fluid flow such that the presence, absence and/or position of the material or object is detectable.

Thus, the pressure sensor and sensing method according to this invention are usable with a digital or analog photocopier, a printer, a facsimile machine, a document handler, a collator, an offset printer, a rotary printer, a paper-making machine, a sheet metal rolling machine, a sheet metal annealing machine, a sheet metal cooling device, an extruder, a conveyor system, or a materials transport system, as well as with numerous other devices, such as web feed transports.

Figure 2:
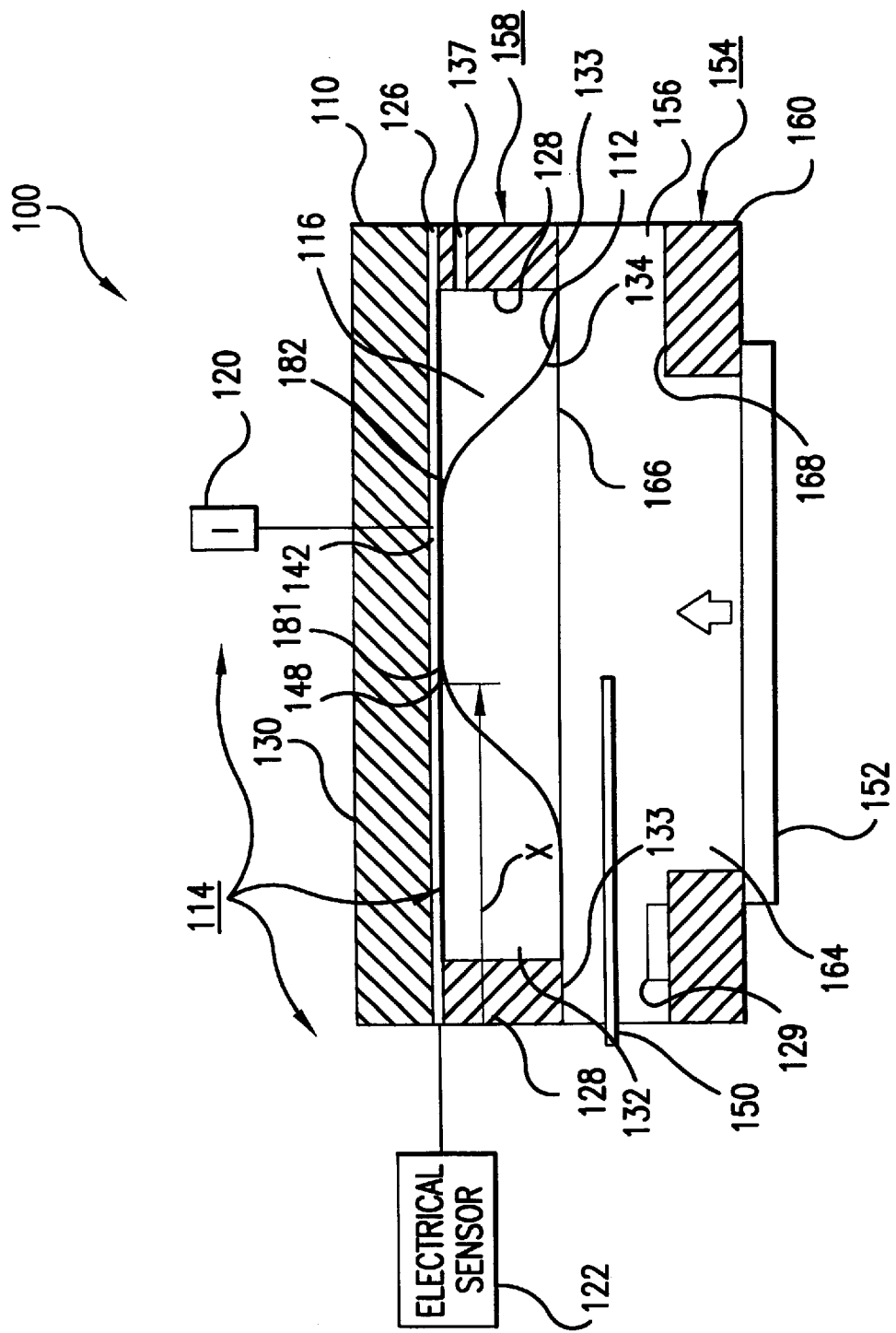
FIG. 2 is a side cross-sectional view of the pressure sensor of FIG. 1 along the line II—II in accordance with this invention.
Figure 3:
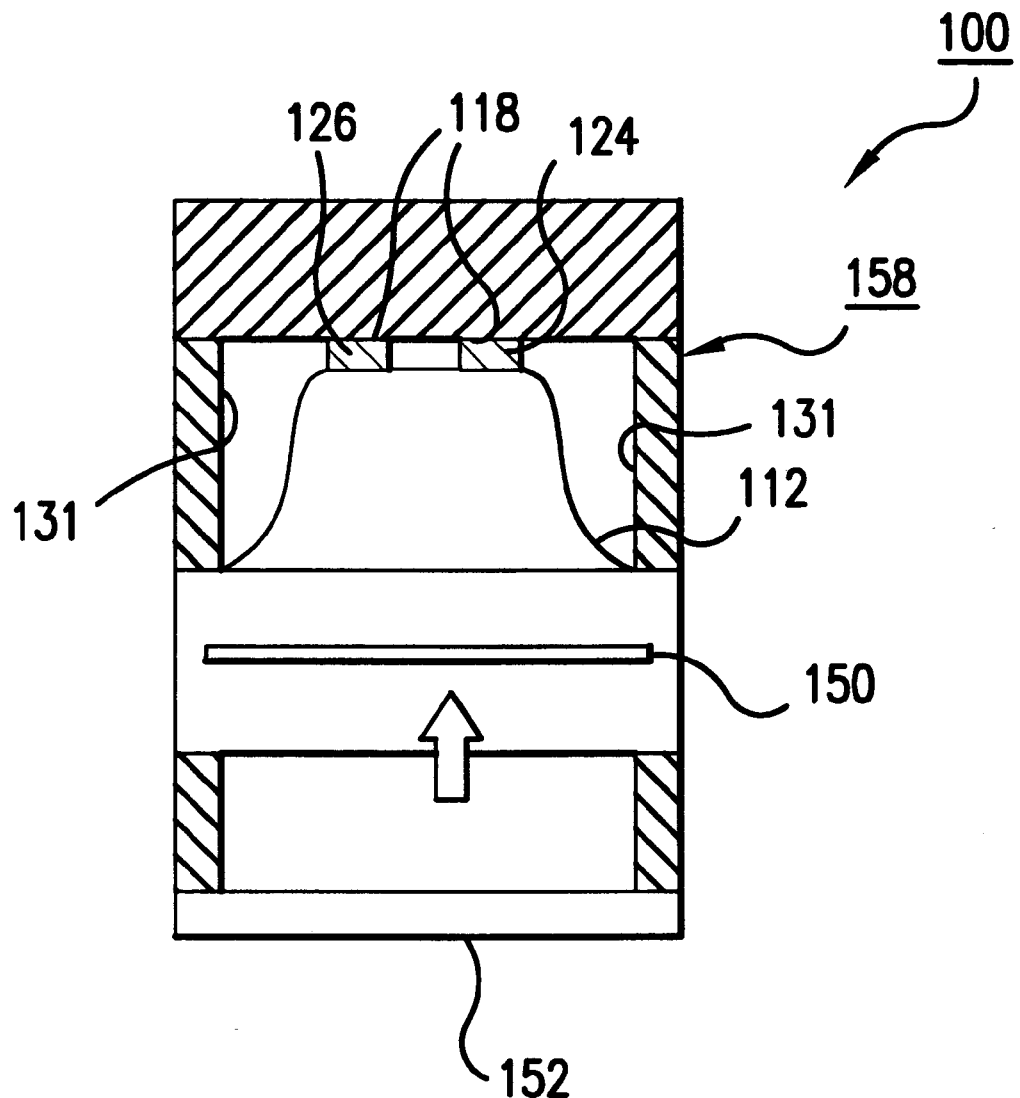
FIG. 3 is an end cross-sectional view of the pressure sensor of FIG. 1 along the line III—III in accordance with this invention.

FIGS. 1–3 show a pressure sensor arrangement 100 including a pressure sensor 110 in accordance with a preferred embodiment of the invention. Also, FIGS. 1–3 show one illustrative use of the pressure sensor 110 of the invention as an object sensor. As shown in FIG. 2, for example, the pressure sensor 110 includes a sensor membrane 112 and a sensor device 114. The sensor membrane 112 is spaced from the sensor device 114 and variably contacts and interacts with the sensor device 114, as is discussed in detail below.

The sensor membrane 112 is disposed along a flat horizontal plane when the sensor membrane 112 is in an undeformed rest position. As shown in FIG. 2, the sensor membrane 112 is positioned in a deformed position when pressure is applied to the sensor membrane 112. The sensor membrane 112 is supported by the sensor device 114. A sensing channel 116 is defined within the sensor device 114. The sensing channel 116 is arranged and the sensor membrane 112 is supported by the sensor device 114 such that the sensor membrane 112 forms one wall of the sensing channel 116. A sensor top wall 130 forms the opposite wall of the sensing channel 116.

Further, the sensing channel 116 defines a sensing space 132 positioned within the sensing channel 116. The sensor membrane 112 has a sensing area 134 adjacent the sensing space 132. More specifically, a sensing area 134 is a portion of the sensor membrane 112 which extends over the sensing space 132. Upon the application of pressure to the sensor membrane 112, the sensor membrane 112 resiliently deforms into the sensing space 132 of the sensing channel 116. Accordingly, the sensor membrane 112 may be constructed of any compliant elastic film which will elastically deform or bend in response to pressure exerted on the sensor membrane 112. For example, the sensor membrane 112 may be a compliant elastic film, such as silicone or a polymer sheet, for example.

The pressure sensor 110 in accordance with the invention also includes the sensor device 114 upon which the sensor membrane 112 is supported. As shown in FIGS. 1 and 2, the sensor device 114 includes a sensor strip 118, a current source 120, and an electrical sensor 122. The sensor strip 118 includes both a resistive strip 124 and a conductive strip 126. The resistive strip 124 and the conductive strip 126 are both positioned in the sensing channel 116 and extend along the length of the sensing channel 116. The resistive strip 124 and the conductive strip 126 are arranged parallel to each other. In accordance with the invention, the sensor membrane 112 is spaced from and variably contacts the sensor strip 118.

The resistive strip 124 may be constructed of a wide variety of materials including nichrome, amorphous silicon, carbon or conductive polymers, for example. The conductive strip 126 may be constructed of copper, gold, steel, or aluminum, for example. The resistive strip 124 and the conductive strip 126 may be any suitable shape, including square, rectangular, circular, or elliptical, for example. The particular shape of the resistive strip 124 and the conductive strip 126, as well as the other dimensions of the pressure sensor 100, will depend on the particular use of the pressure sensor 110. As shown in FIG. 2, both the resistive strip 124 and the conductive strip 126 are rectangular in shape and are attached to a sensing channel top wall 130 within the sensing channel 116.

It should be recognized that only minimal contact resistance should occur between each of the resistive strip and the conductive strip when contacting the sensor membrane. Accordingly, the surfaces of the resistive strip, the conductive strip and the conductive sensor membrane should be such that their mutual contact resistance remains small compared with the resistance of the resistance strip 124. Further, it should be recognized that certain corrections may be factored into the pressure sensor arrangement, i.e. the electrical sensor 122, to account for any small resistances created at the contact surfaces. However, an accurate determination will be more difficult to attain as the contact resistance increases relative to the resistance of the resistive strip 124.

As shown in FIG. 2, the sensing space 132 defines a space inaccessible to the pressurized fluid. However, a vent 137 or vents located in the side or top wall of the sensing space may be provided to allow volume changes within the sensing space 132 during deformation of the sensor membrane 112. In other embodiments in accordance with the invention, the sensing space can be fluid tight, provided the distance that the sensor membrane must deform to contact the sensor strip is small enough, as described further below.

As described above, the contact resistance of the components in the sensing space 132 should be limited. By providing a fluid-tight sensing space 132, the environment in the sensing space 132 may be controlled to limit the contact resistance by preventing rust and other corrosion, for example. Further, it should be recognized that any fluid present in the sensing space 132 should be electrically insulating to avoid inappropriate shorting between the components. Also, if the sensing space 132 is not fluid-tight, the fluid impacting on the sensor membrane 112 may enter the sensing space. Under such circumstances, the fluid must be electrically insulating.

As shown in FIG. 2, the lateral walls of the sensing channel 116 in which the sensor strip 118 is supported are defined by a housing in which the sensing channel is disposed, i.e., a sensor portion 158. However, it should be recognized that any of a wide variety of constructs, types and shapes of housings may be used to define the sensing channel 116. However, it is preferable that the housing be constructed of material which is not electrically conductive. Illustratively, FIG. 2 shows that the sensor portion 158 includes a pair of sensing channel end walls 128 and the sensing channel top wall 130. FIG. 3 shows a pair of sensing channel side walls 131 of the sensor portion 158. The sensing channel 16 is defined by the interior surfaces of the sensing channel side walls 131, the sensing channel end walls 128, and the sensing channel top wall 130. As shown in FIGS. 2 and 3, the sensor strip 118 extends between one sensing channel end wall 128 to the opposing sensing channel end wall 128. Both the conductive strip 126 and the resistive strip 124 are arranged parallel to the sensing channel side walls 131. However, various alternatives are within the scope of the invention, including the conductive strip and the resistive strip extending only a portion of the length of the sensing channel or a plurality of sensor strips arranged end to end. Moreover, the conductive strip can be eliminated and the current source connected to the sensor membrane. Such an embodiment of the invention is described below in conjunction with FIG. 11.

As shown in FIG. 3, the sensor membrane 112 is attached to the sensing channel side walls 131 at a lower portion of the sensing channel side walls 131. As shown in FIG. 2, the sensor membrane 112 is attached to the sensing channel end walls 128 at a lower portion or lower face 133 of the sensing channel end walls 128. The sensor membrane 112 may be laminated onto the lower portions of the sensing channel side walls 131 and to the sensing channel end walls 128.

As shown in FIG. 2, the sensor membrane 112 is in a deformed condition due to a force exerted on the sensor membrane. In some embodiments of the pressure sensor 100, the sensor membrane 112 is positioned in an undeformed substantially flat condition, i.e., a rest condition, when no force is exerted on the sensor membrane. For example, as shown in FIG. 2, the sensor membrane would lay in a plane parallel to the lower face 133 of the sensing channel end walls 128 when in the rest condition. A gap exists between the sensor membrane 112, when in the rest position, and the sensor strip 118. As described above, if the gap is small enough, the sensing space 132 may be fluid tight. In addition, it should be recognized that the sensor membrane 112 according to the invention may be formed into a wide variety of shapes and sizes. For example, the rest position of the sensor membrane does not have to be planar, but rather can be curved, arcuate, or include a plurality of grooves, for example.

Further, in an alternative arrangement, the sensor strips may be positioned in electrical and physical contact with the sensor membrane when the sensor membrane is in a rest condition. In this arrangement, the pressure source would force the sensor membrane away from, rather than toward, the sensor strip. In such an embodiment, when the pressure source is a fluid flow source, the fluid flow source would necessarily be electrically insulating.

The sensor membrane 112 can be formed of a flexible conductive material such as carbon-loaded silicone (or other conductive polymers) or can be formed of a flexible film and a conductive film attached to the flexible film, such as aluminized mylar. Furthermore, the sensor membrane 112 can be segmented so that certain portions provide the function of stretching, and other portions provide the function of being flexible, but non-stretching. For example, two segments of the sensor membrane that are flexible, but non-stretching, can be separated by a portion of the sensor membrane that has the ability to stretch. Alternatively, two segments of the sensor membrane that have the ability to stretch can be separated by a portion of the sensor membrane that is flexible but non-stretching. For example, left and right-most elements or segments of the sensor membrane may be constructed of silicone and a center element constructed of aluminized mylar. In some embodiments, the sensor membrane 112 may be constructed of any compliant elastic film which will provide sufficient resilience. Alternatively, the sensor membrane 112 may be constructed of a bendable film which does not stretch. However, this requires that the gap between the sensor membrane 112 and the sensor strip 118 is small enough such that elongation of the sensor membrane is not necessary.

As shown in FIG. 1, the resistive strip 124 includes a ground end 125 and a floating end 127. The resistive strip 124 extends between the ground end 125 and the floating end 127. As shown in FIGS. 1 and 2, the current source 120 is electrically connected to the conductive strip 126 at a current application point 142, which may be positioned anywhere along the length of the conductive strip 126. The electrical sensor 122 includes a differential voltage amplifier 144. The differential voltage amplifier 144 includes two input terminals 144A and 144B and an output terminal 144C. The input terminal 144A of the differential voltage amplifier 144 is electrically connected to the conductive strip 126 at any point along the conductive strip 126. The ground end 125 of the resistive strip 124 is connected to the input terminal 144B of the differential voltage amplifier.

The electrical sensor 122 may be physically located at some position exterior to the sensor portion 158. Alternatively, the electrical sensor 122 may be positioned within the sensor portion 158. Further, a plurality of electrical sensors may be located in a central location in a device to monitor a plurality of sensor strips.

In the absence of pressure exerted on the sensor membrane 112, the sensor membrane 112 is positioned in an undeformed rest position. In the undeformed rest position, the sensor membrane 112 is flat and is positioned in a plane lying parallel to, but spaced from, the sensor strip 118. Alternatively, the sensor membrane 112 may be constructed so that a portion of the sensor membrane 112 contacts the sensor strip 118 at a predefined position when the sensor membrane is in the "rest" position.

When pressure is applied to the sensing area 134 of the sensor membrane 112, the sensor membrane 112 yields to the pressure and deforms or distends into the sensing space 132 and towards the sensor strip 118. As a certain threshold deformation is attained as a result of a threshold pressure being exerted along at least some portion of the sensing area 134, the sensor membrane 112 will deform enough to contact the sensor strip 118. More specifically, the sensor membrane 112 will contact both the conductive strip 126 and the resistive strip 124 of the sensor strip 118. As the point of application of the pressure applied to the sensing area 134 varies along the length of the sensing area 134, the point along the sensor strip 118 at which the conductive strip 126 is connected to the resistive strip 124 via the sensor membrane 112 will vary.

Since the sensor membrane 112 is conductive, the sensor membrane 112 provides an electrical connection between the conductive strip 126 and the resistive strip 124 that allows current to pass from the conductive strip 126 to the resistive strip 124. More specifically, as shown in FIG. 2, pressure is exerted upon the sensor membrane 112 such that the sensor membrane 112 contacts the sensor strip 118 from a point 181 to a point 182. Illustratively, the pressure applied to the sensor membrane 112 may vary and be applied to the left of the point 181. As a result, the sensor membrane 112 experiences sufficient deformation to contact the sensor strip 118 at a position to the left of the point 181. In this manner, the left-most point, as shown in FIG. 2, at which the sensor membrane 112 contacts the sensor strip 118 will vary. This variance is directly related to the pressure or force profile exerted on the sensor membrane 112.

Figure 4:
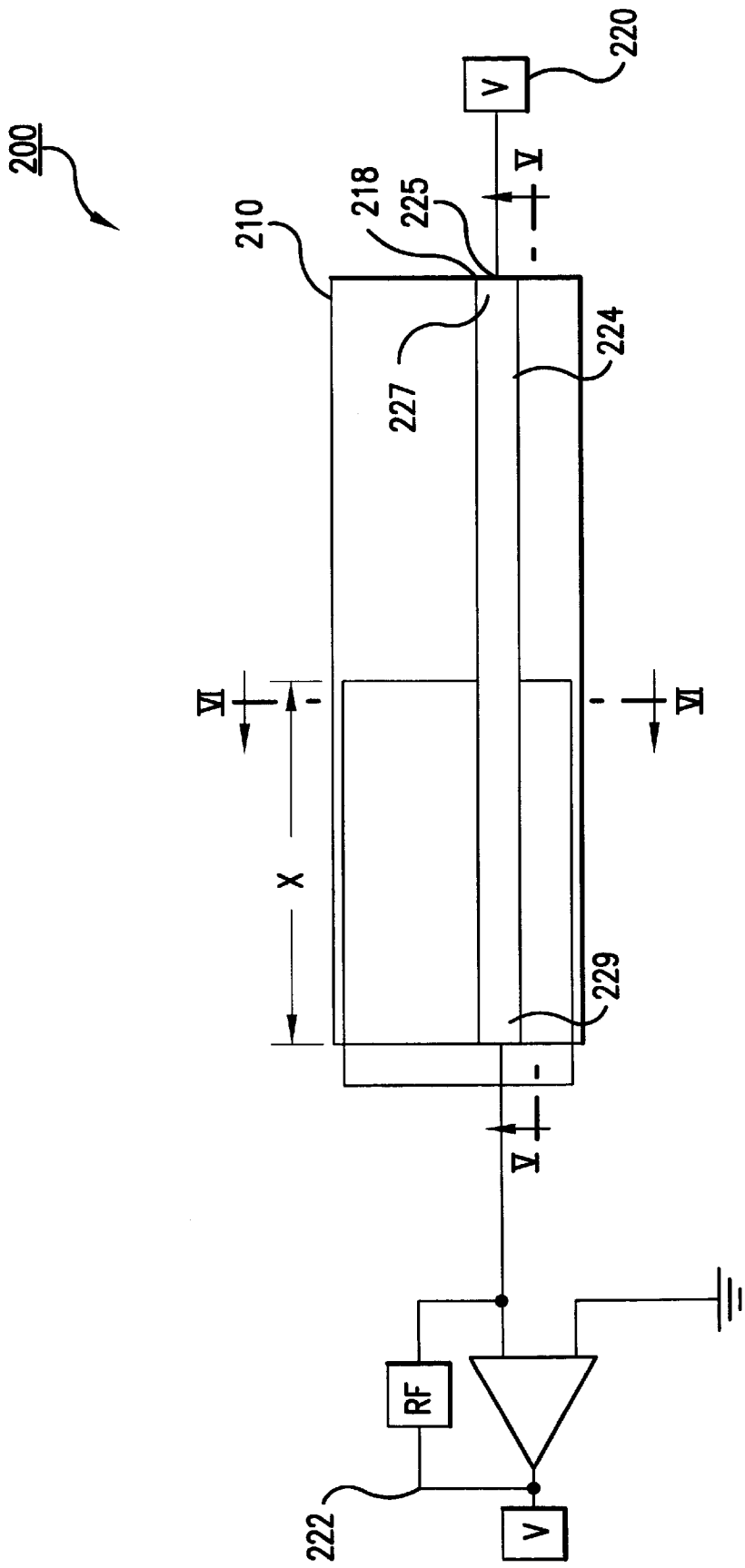
FIG. 4 is a top plan view of a pressure sensor in accordance with a further embodiment of this invention.
Figure 7:
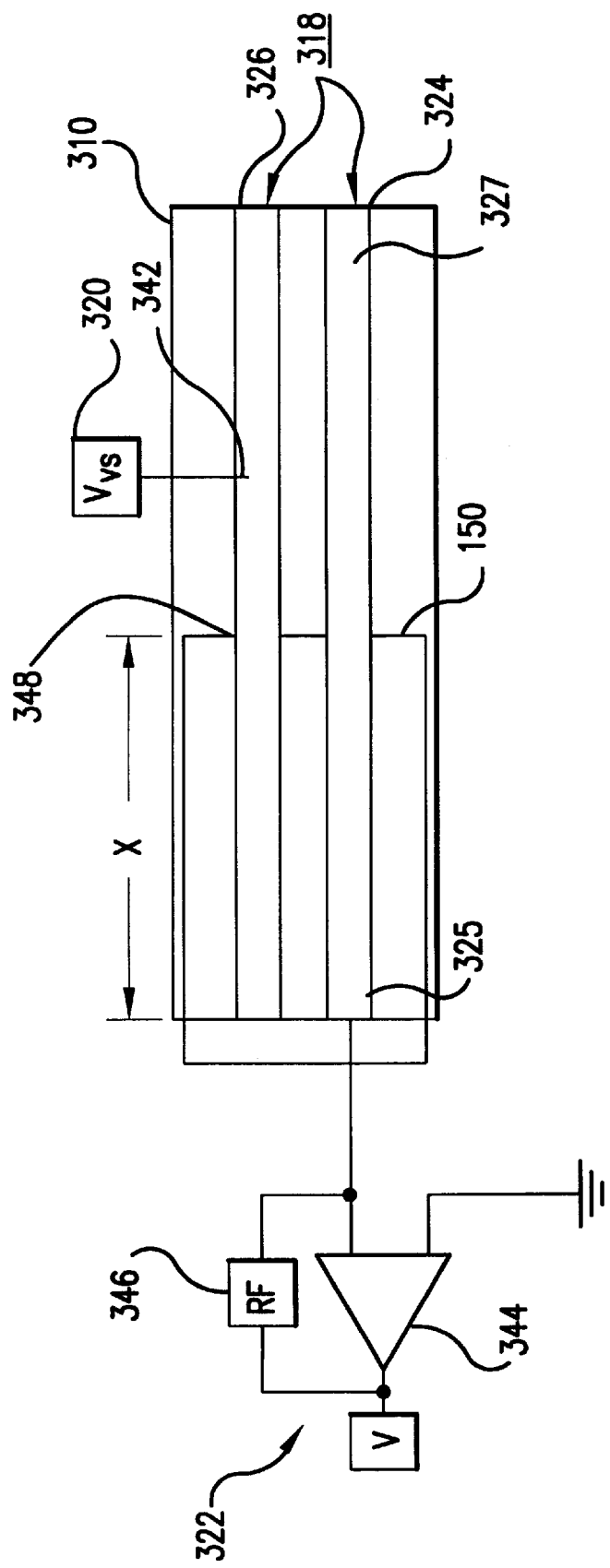
FIG. 7 is a top plan view of a pressure sensor utilizing a voltage source in accordance with embodiments of this invention.

As described above, the sensor strip 118 may be used in conjunction with the current source 120 to sense the position or presence, for example, of an object 150. However, the invention is not limited to such an arrangement and may be constructed in a wide variety of other arrangements. For example, as shown in FIGS. 4 and 7 and described below, a voltage source may be used instead of a current source.

As described above, the current source 120 is connected to the conductive strip 126 at a current application point 142 at some point along the length of the conductive strip 126. The conductive strip 126 has a resistance that is at least a twenty times lower than that of the resistive strip 124. Accordingly, as the current provided by the current source 120 flows through the conductive strip 126, the voltage drop due to the resistance of the conductive strip 126 is minimal. Further, since the resistance of the conductive strip 126 is lower than that of the resistive strip 124, given an option of conductive paths, current will pass through the conductive strip 126 instead of the resistive strip 124.

Due to the voltage applied to the conductive strip 126 by the current source 120, the electric current flows into and along the length of the conductive strip 126. Because of the minimal resistance of the conductive strip 126, the conductive strip 126 will essentially be electrified at a constant voltage throughout the length of the conductive strip 126. Further, as described above, the resistance across the flexible membrane 112 is also small compared with the resistance of the resistive strip 124.

As described above, depending on the particular application of pressure upon the sensing area 134 of the sensor membrane 112, the contact point 148 will vary, e.g., the left-most point at which the sensor membrane 112 contacts the sensor strip 118 will vary. Thus the resistive strip 124 is electrically connected to the conductive strip 126 depending on the contact point 148. To complete the circuit from the current source 120 to the electrical sensor 122, current will travel as far to the left, as shown in FIG. 2, as possible in the conductive strip 126. However, because the input impedance of the sensor amplifier 144 is much larger than that of the resistive film, at the contact point 148 the current will necessarily pass from the conductive strip 126, through the sensor membrane 112, and to the resistive strip 124. Thereafter, the current will flow through the resistive strip 124 to the left toward the electrical sensor 122. More specifically, the current will flow to the ground end 125 of the resistive strip 124 and to terminal 144B of the amplifier 144.

The electrical sensor 122 is electrically connected to both the current source 120 (or the conductive strip 126) and the ground end 125 of the resistive strip 124. As the current passes from the contact point 148, i.e., the point at which the sensor membrane 112 contacts the sensor strip 118, to the point of connection of the electrical sensor 122 to the resistive strip 124, the current will experience a voltage drop. The specific voltage drop is dependent upon the distance the current travels through the resistive strip 124. The distance the current travels is dependent upon the contact point 148. The contact point 148 is controlled by the pressure or force profile exerted on the sensor membrane 112. The electrical sensor 122 senses this voltage drop across the non-shorted segment of the resistive strip 124.

That is, the voltage present across the resistive strip 124 between the ground end 125 and the contact point 148 of the resistive strip 124 is linearly dependent on the distance x, as shown in FIGS. 1 and 2, that the current has traveled through the resistive strip 124. The distance x is the distance between the contact point 148 and the ground end 125 of the resistive strip 124

Illustratively, the resistive strip 124 has a length L. Further, the resistive strip 124 has a resistance R for the entire extent or length L of the resistive strip 124. Accordingly, the distance x is:

$$x=L(r/R),$$

where r is the determined resistance between the contact point 148 and the ground end 125. The value r is determined based on the output voltage $V_o$ output by the electrical sensor 122. More specifically, $V_o$ is the voltage output through the terminal 144C of the differential voltage amplifier 144. The current source 120 generates a constant current $I_{cs}$ and outputs that current at a variable current source voltage $V_{cs}$. The voltage, $V_{cs}=r*I_{cs}$, is generated by the current source 120 to keep the current flowing through the resistive strip 124 constant at $I_{cs}$. The output voltage $V_o$ of the electrical sensor amplifier 144 is G times larger than the voltage difference $\Delta V$ on the input terminals 144A and 144B of the differential amplifier 144. Because the input terminal 144B is tied to ground and the input terminal 144A is tied to $V_{cs}$, $\Delta V$ is equal to $V_{cs}$. Thus, $V_o$ will be G times the input voltage $V_{cs}$ input to the electrical sensor amplifier 144 from the sensor strip 118.

That is, $I_{cs}$ is fixed at the output current of the current source. The resistance r is variable, depending on the object position. Further, the inputs 144A and 144B of the amplifier 144 draw no current. As a result:

$$V_{cs}=I_{cs}*r.$$

Additionally, the gain G of the amplifier 144 is:

$$G=V_o/V_{cs}.$$

Therefore:

$$V_o=G*V_{cs}.$$

However, the gain G is fixed. Thus, because $V_{cs}=I_{cs}*r$: Therefore:

$$r=V_o/(G*I_{cs}), \text{ and}$$

$$x=L*V_o/(G*I_{cs}*R).$$

Thus, r is function of the fixed output current $I_{cs}$ and the fixed gain G. Therefore, r can be determined from the measured output voltage $V_o$ of the amplifier 144. Thus, the distance x is also able to be determined. Accordingly, the sensor output voltage, $V_o$, is an accurate indicator of the point at which the sensor membrane 112 provides a connection between the conductive strip 126 and the resistive strip 124.

Figure 5:
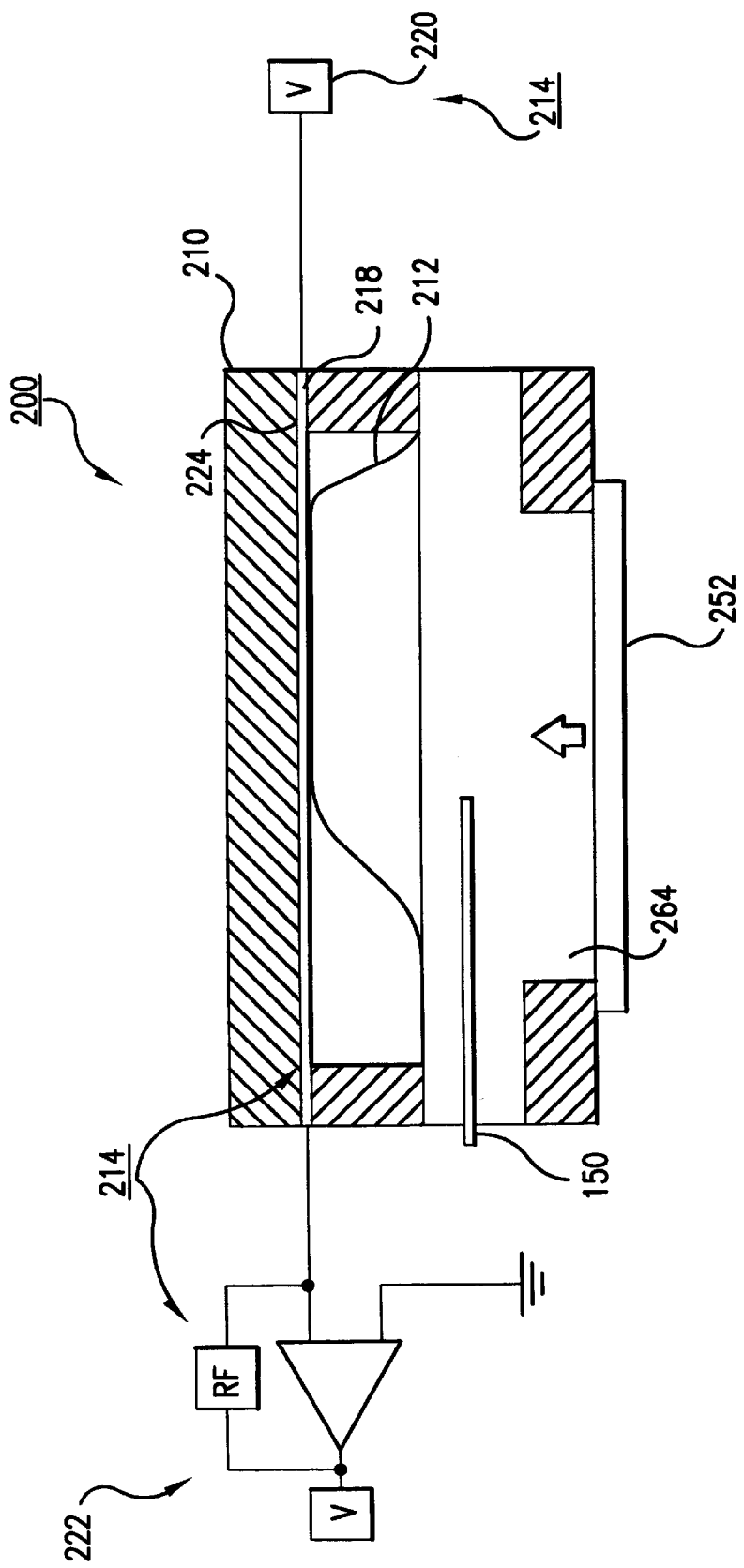
FIG. 5 is a side cross-sectional view of the pressure sensor of FIG. 4 along the line V—V in accordance with this invention.
Figure 6:
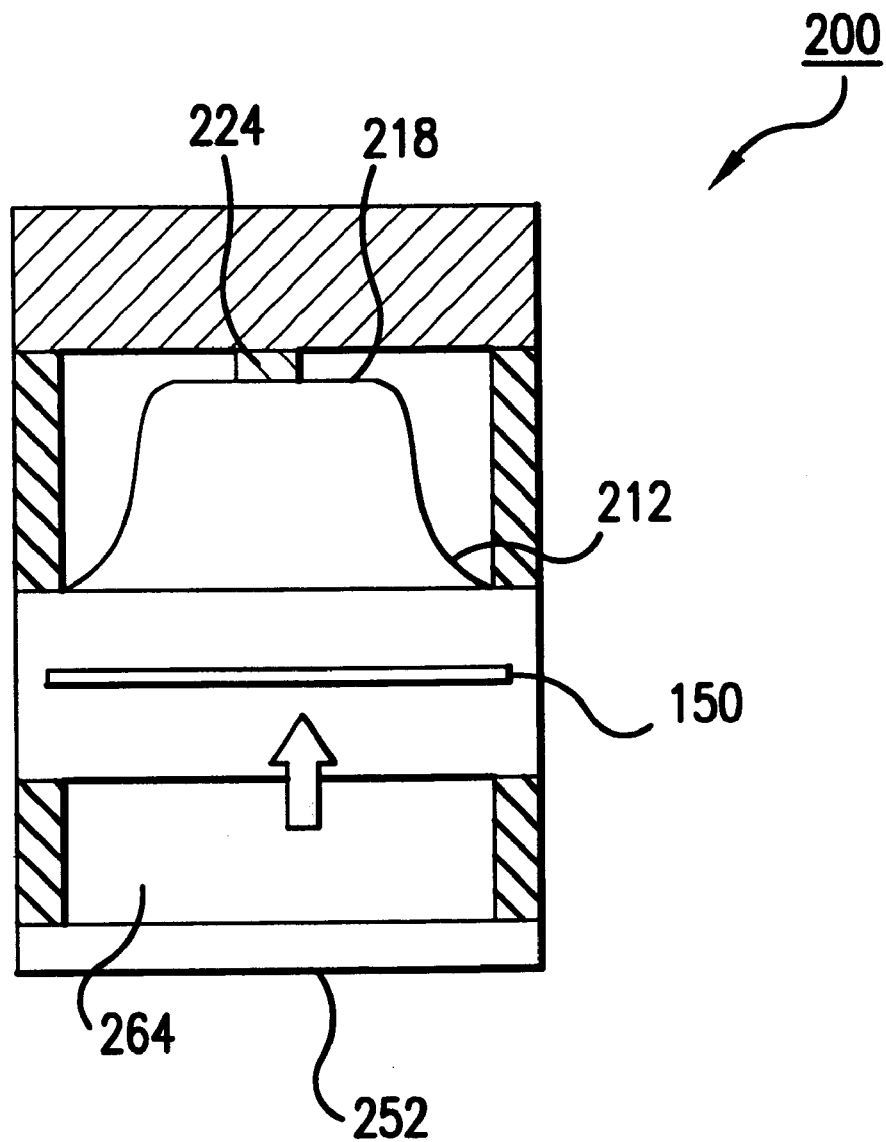
FIG. 6 is an end cross-sectional view of the pressure sensor of FIG. 4 along the line VI—VI in accordance with this invention.

FIGS. 4–6 show an alternative embodiment directed to a sensor device that does not include a conductive strip. The embodiment shown in FIGS. 4–6 is described in detail below.

FIG. 7 shows an alternative embodiment of the invention that utilizes a voltage source 320. The voltage source 320 is connected to the conductive strip 326 at a voltage application point 342 at a point along the length of the conductive strip 326. As in the embodiment shown in FIG. 1, the conductive strip 326 has a resistance at least twenty times lower than that of the resistive strip 324. Accordingly, as the current provided by the voltage source 320 flows through the conductive strip 326, the voltage drop due to the resistance of the conductive strip 326 is minimal. Further, since the resistance of the conductive strip 326 is lower than that of the resistive strip 324, given an option of conductive paths, current will pass through the conductive strip 326 instead of the resistive strip 324. When current is applied to the conductive strip 326 by the voltage source 320, the electric current flows into and along the length of the conductive strip 326. Because of the minimal resistance of the conductive strip 326, the conductive strip 326 will essentially be electrified at a constant voltage throughout the length of the conductive strip 326. Further, as described above, a sensor membrane used in conjunction with the pressure sensor 310 may include a metal-coated elastomeric film or conducting polymer. As a result, the resistance across the conducting film of the flexible membrane is also small compared with the resistance of the resistive strip 324.

As described above, depending on the particular application of pressure upon the sensing area of the sensor membrane, the contact point will vary, e.g., the left-most point at which the sensor membrane contacts the sensor strip 318 will vary. Thus, the resistive strip 324 is electrically connected to the conductive strip 326 depending on the position of the contact point. The electrical sensor 322 may include a transconductance current sensor amplifier 344, for example. To complete the circuit from the voltage source 320 to the transconductance current sensor amplifier 344, current will travel as far to the left, as defined in FIG. 7, as possible in the conductive strip 326. The current will necessarily pass from the conductive strip 326, through the sensor membrane, and to the resistive strip 324. Thereafter, the current will flow through the resistive strip 324 to the left toward the current or transimpedance amplifier 322.

More specifically, the current will flow to the end 325 of the resistive strip 324 held at virtual ground by the amplifier 344. As the current passes from the contact point 148, i.e., the point at which the sensor membrane 112 contacts the sensor strip 318, to the point of connection of the current amplifier 322 to the resistive strip 324, the current will be determined by the resistance of the resistive strip 324. The resistance is dependent upon the contact point 148. The contact point 148 is controlled by the pressure or force profile exerted on the sensor membrane 312. The transimpedance current amplifier 344 senses this current.

That is, the current present across the resistive strip 324 between the end 325 and the contact point 348 of the resistive strip 324 is inversely dependent on the distance x, as shown in FIG. 7, that the current has traveled through the resistive strip 324. The distance x is the distance between the contact point 348 and the end 325 of the resistive strip 324. The value r is determined based on the voltage output by the current amplifier.

Specifically, the voltage source outputs a varying current IVS and a constant voltage $V_{vs}$. The current $I_{vs}$ generated and flowing through the resistive strip 324 depends on the voltage $V_{vs}$ of the voltage source 320 and the resistance r of the resistive strip 324 between the contact point and the end 325, i.e.:

$$I_{vs}=V_{vs}/r.$$

The transimpedance amplifier 322 will create a voltage output:

$$V_o=R_f{}^*I_{vs},$$

where $R_f$ is the resistance of the feedback resistor 346. This results in the relationship:

$$r=(V_{vs}{}^*R_f)/V_o.$$

Because of the relationship:

$$x/L=r/R=V_o(L)/V_o(x),$$

where $V_o$ is a function of L and x, then:

$$x=L{}^*V_o(L)/V_o(x)$$

As a result, the transimpedance amplifier 322 determines x through this relationship. Accordingly, output voltage, $V_o$, is an accurate indicator of the point at which the sensor membrane 312 provides a connection, i.e., a short, between the conductive strip 326 and the resistive strip 324.

Figure 8:
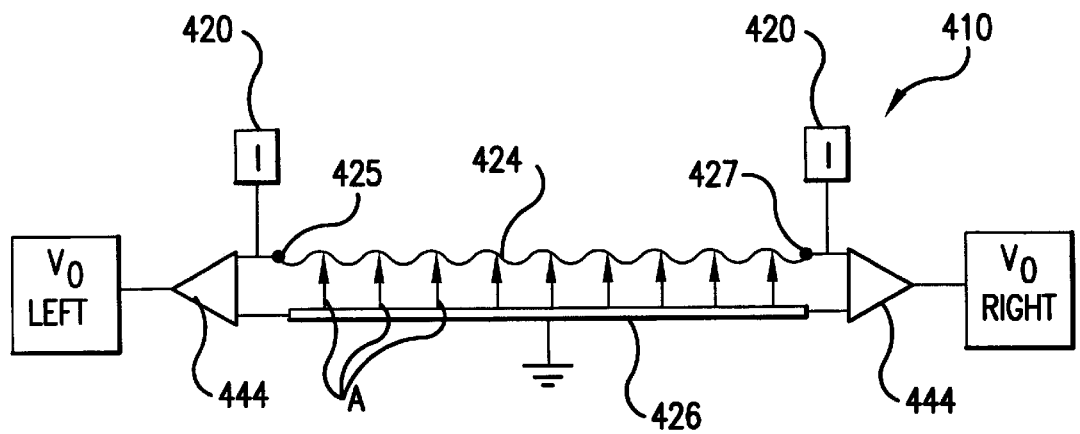
FIG. 8 is a circuit diagram of a pressure sensor utilizing a current source with no paper sheet present in accordance with embodiments of this invention.
Figure 9:
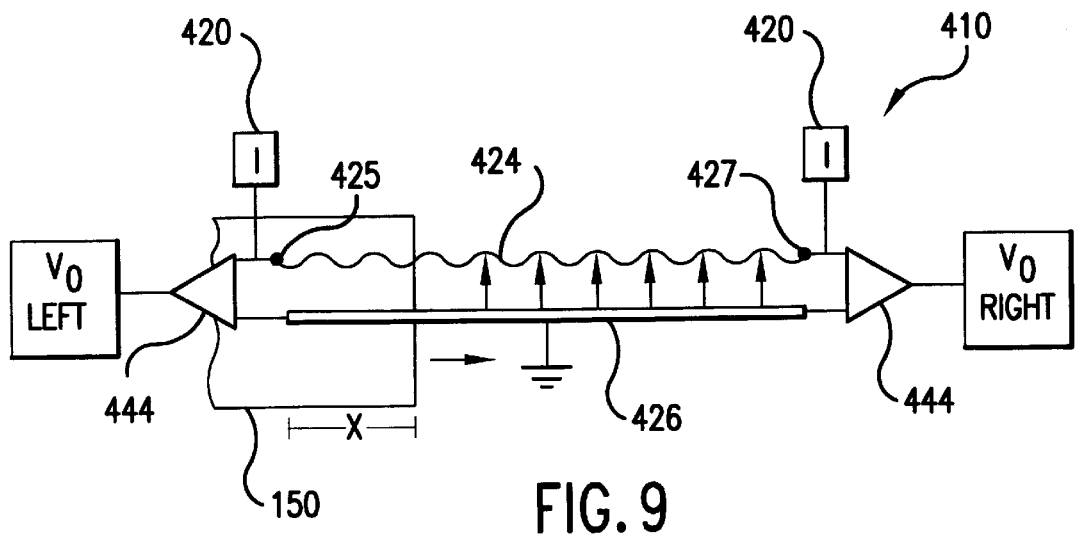
FIG. 9 is a circuit diagram of the pressure sensor of FIG. 8 with a single paper sheet present.
Figure 10:
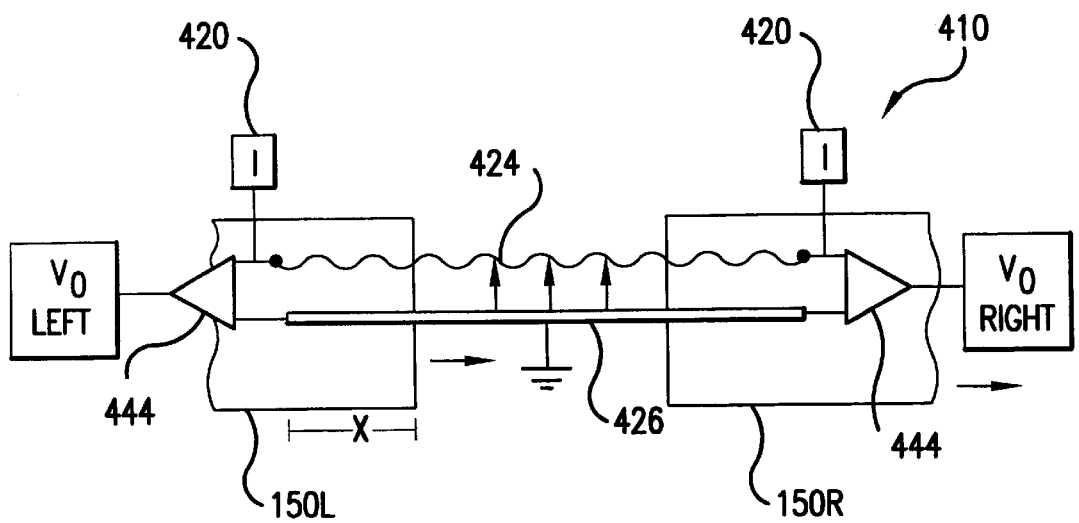
FIG. 10 is a circuit diagram of the pressure sensor of FIGS. 8 and 9 with two paper sheets present.

FIGS. 8–10 show a further embodiment of the pressure sensor according to this invention using a pair of current sources to sense the position or presence of an object, for example, such as a sheet of paper 150. In FIG. 8, an object is not present in the pressure sensor 410. As shown in FIG. 9, a single object is present at one side of the pressure sensor 410. Further, as shown in FIG. 10, two objects are present at respective sides of the pressure sensor 410.

As shown in FIGS. 8–10, for example, two of the sensors shown in FIG. 1 may be used to apply a current source to both ends of the resistive strip 424. Further, FIGS. 8–10 illustrate that the current source may be connected to the resistive strip, rather than to the conductive strip as shown in FIG. 1, for example. However, it should be recognized that in the sensor shown in FIG. 1, the current source could be connected to the resistive strip using alternative circuitry.

As shown in FIGS. 8–10, two differential amplifiers 444 may be provided in electrical connection with the left end 425 of the resistive strip and the right end 427 of the resistive strip 424, respectively. This arrangement allows edge sensing of either edge of the paper or other media. On each side, a constant current source 420 drives a current $I_{cs}$ through the resistive segment or segments of the resistive strip, depending on the position of the object in the pressure sensor. The arrows "A" in FIGS. 8–10 designate where the sensor membrane (not shown) electrically connects the resistive strip 424 and the conductive strip 426. The conductive strip 426 is grounded at an arbitrary point.

In FIG. 8, no object is present in the pressure sensor 410. As a result, the force impacting on the sensor membrane (as discussed above) will deform the sensor membrane such that the resistive strip 424 is connected, i.e. shorted, to the conductive strip 426 along the entire length of the conductive strip 426. Thus, the current will pass through only a small segment (if any) of the resistive strip 424 before flowing through the conductive strip 426 and to ground. As a result, each current source 420 will require negligible voltage to supply the saturated current. The input terminals of the amplifiers 444 will see an essentially equal voltage. Thus, the voltage $V_o$ output from the amplifiers will be close to zero.

In FIG. 9, an object 150 enters the pressure sensor 410. Accordingly, the amplifier 444 on the left will now sense the leading edge of the object 150. Specifically, the current generated from the left current source 420 will necessarily pass through the resistive strip 424 a distance x before it shorts to the conductive strip and flows to ground. The voltage required by the current source is:

$$V_{cs}=(x/L){}^*R{}^*I_{cs}$$

Accordingly, as described above, the distance x is determined as a function of the detected output voltage $V_o$ and the current $I_{cs}$ supplied by the current source 420. As a result, the distance x may be determined and in turn the position of the leading edge of the paper determined.

Further, it should be recognized that the pressure sensor 410, when using the amplifier 444 on the right as shown in FIG. 9, can sense the trailing edge of a paper sheet as the paper sheet leaves the pressure sensor 410. Specifically, the right amplifier 444 senses the trailing edge of a paper sheet in a manner similar to the left amplifier sensing the leading edge of the paper sheet. This aspect of the pressure sensor 410 is described further with reference to FIG. 10.

In FIG. 10, an object 150L enters and an object 150R leaves the pressure sensor 410. Accordingly, the amplifier 444 on the left will sense the leading edge of the object 150L. The amplifier 444 on the right will sense the trailing edge of the object 150R. Specifically, the current generated from the left current source 420 will necessarily pass through the resistive strip 424 a distance x before it shorts to the conductive strip and flows to ground. Accordingly, as described above, the distance x is determined as a function of the detected output voltage $V_o$ and the current $I_{cs}$ supplied by the current source 420. As a result, the distance x may be determined and in turn the position of the leading edge of the object 150L determined. The trailing edge of the object 150R is determined in a similar manner. As a result, it should be recognized that the spacing between the leading edge of the object 150L and the trailing edge of the object 150R may be determined.

Referring to FIG. 1, electrical sensor 122 provides an indication of the voltage drop experienced as the current passes through the resistive strip 124. As a result, the electrical sensor 122 is capable of providing an indication of the location of the contact point 148. Since the contact point 148 is dependent upon the pressure exerted on the sensor membrane 112, the electrical sensor 122 is capable of providing an indication of the pressure exerted on the sensor membrane 112. The degree of deformation of the sensor membrane 112 is dependent on the pressure profile applied to the sensor membrane 112. As a result, the pressure applied to the sensor membrane 112 or the specific point of application of the pressure, may be determined based on the contact point 148 of the sensor membrane 112 to the sensor strip 118. As additional pressure is applied to the sensor membrane 112 or as the point of application of the pressure varies, the sensor membrane 112 deforms to vary the contact point 148 of the sensor membrane 112 to the sensor strip 118.

As described above, the resistive strip 124 can be any of a wide variety of shapes. Further, it should be recognized that the resistive strip 124 can be simply a narrow strip extending from the ground end 125 to the floating end 127. Alternatively, the resistive strip 124 may be constructed of a meandering resistive strip 124. The meandering resistive strip 124 may be used in certain applications in which it is necessary to increase the electrical resistivity of the resistive strip 124 from the floating end 127 to the end 125 of the resistive strip 124.

Illustratively, as shown in FIGS. 1–3 and 7–10, the pressure sensor 110 of this invention may be used in an object sensor arrangement 100 in accordance with one aspect of the invention. The pressure sensor arrangement 100 may be positioned in any device in which it is necessary to detect the presence, absence or position of an object 150. Illustratively, the pressure sensor arrangement 100 in accordance with the invention may be utilized in coffee machines or in conjunction with a robotic arm to determine a position of the object 150. Alternatively, the pressure sensor arrangement 100 may be positioned in an area of a photocopy device in which it is necessary to sense the position of the object 150, such as a sheet of paper. Such an area of a photocopier may be adjacent an image forming engine, a registration module or an output tray, for example. In a web feed system, motion of the edge of the web can be sensed.

As shown in FIG. 2, the pressure sensor arrangement 100 includes at least one pressure sensor 110, which is integrated with a fluid flow source 152. As described above, the pressure sensor 110 used in the pressure sensor arrangement 100 includes a sensor device 114 and a sensor membrane 112. The fluid flow source 152 is an air jet or air knife source, for example, driven by a fan. The pressure sensor arrangement 100 further includes a sensor housing 154 having an object passage 156 through which an object 150 to be sensed can be transported. The sensor housing 154 includes the sensor portion 158 and a jet portion 160. The pressure sensor arrangement 100 further includes an inflow passage 164 through which the flow of fluid passes. The object passage 156 is connected to and communicates with the inflow passage 164. The object passage 156 has a fluid outflow surface 166 and a fluid inflow surface 168. Fluid flows into the object passage 156 from the inflow passage 164 through the fluid inflow surface 168. Fluid flows across the object passage 156 and impacts or impinges upon the fluid outflow surface 166. At rest, the sensor membrane 112 of the pressure sensor 110 is positioned flush with the fluid outflow surface 166 and forms a portion of the fluid outflow surface 166.

The fluid outflow surface 166 defines one surface of the object passage 156 and the fluid inflow surface 168 defines an opposite surface of the object passage 156. The dimensions of the object passage 156 may be any dimensions suitable to allow the object 150 to pass through the object passage 156. For example, the object passage 156 may be dimensioned to accommodate a sheet of paper.

The perimeters of the inflow passage 164 may be of any suitable shape, such as square or circular. However, a circular shape may reduce the turbulence in the fluid flow occurring in the inflow passage 164, relative to a square shape. As a result, the sensitivity and accuracy of the pressure sensor arrangement 100 having a circular inflow passage may be improved, compared to a pressure sensor arrangement 100 having a square inflow passage. However, it should be appreciated that the shape of the perimeters of the inflow passage 164 is an independent feature and the pressure sensor 110 and sensing method according to this invention can be used with any inflow passage 164 having any shape.

FIG. 2 illustratively shows an image forming engine 129. The image forming engine 129 can be positioned adjacent the object passage 156. The image forming engine 129 may be any known arrangement, such as a photosensitive drum or an ink cartridge arrangement, capable of reproducing an image on the paper sheet 150 as the paper sheet 150 passes by the image forming engine 129. However, it should be appreciated that, as outlined above, the pressure sensor arrangement 100 can be used anywhere a presence or absence of an object, or a position of the object, needs to be determined, so long as the pressure sensor arrangement 100 can be provided with the required fluid flow.

FIG. 2 shows one fluid flow source 152 and one fluid inflow passage 164. However, it should be understood that the invention is not limited to using only a single fluid flow source 152 and a single fluid inflow passage 164. Rather, a plurality of fluid flow sources 152 and/or a plurality of fluid inflow passages 164 may be used in conjunction with one pressure sensor 110 and/or a plurality of pressure sensors 110. Further, it should be recognized that either or both the fluid flow sources 152, the fluid inflow passages 164 and/or the pressure sensors 110 may be arranged in any number of geometrical arrangements including one-dimensional arrays or two-dimensional arrays.

The inflow passage 164 is formed within and extends through the jet portion 160. The inflow passage 164 connects with the object passage 156 at an exit end of the inflow passage 164. The pressure sensor 110 of the invention is positioned at the fluid outflow surface 166 opposing the inflow passage 164.

The fluid flow source 152 is positioned to generate a flow of fluid through the inflow passage 164. The flow of fluid may be created using any suitable arrangement which will provide a suitable fluid velocity. Preferably, in this illustrative embodiment, the fluid flow source 152 is one or more air jets. The velocity of the fluid flow generated by the fluid flow source 152 will vary depending on the specific application. However, in this illustrative embodiment, the velocity of the fluid flow generated by the fluid flow source 152 must be compatible with the construction and dimensions of the specific pressure sensor 110 used. The dimensions of the fluid flow source 152 will also vary depending on the specific application.

In operation, when an object 150 is not present in the object passage 156, the fluid flow passing through the inflow passage 164 is unimpeded and impacts the sensor membrane 112 of the pressure sensor 110 to deform the sensor membrane 112 from its rest position. As a result, the unimpeded fluid flow through the inflow passage 164 will impinge on the sensor membrane 112 along the entire extent of the sensing area 134 opposing the fluid inflow passage 164. Thus, in this illustrative embodiment, the dimensions of the fluid inflow passage 164, the object passage 156, the dimensions and resilience of the sensor membrane 112, the distance the sensor membrane 112 is positioned from the sensor strip 118, as well as the magnitude of the fluid flow generated by the fluid flow source 152, will all result in an arrangement in which the sensor membrane 112 will be in contact with the sensor strip 118 along the entire length of the sensor strip 118 opposing the fluid inflow passage 164. Further, the arrangement is such that as an object passes between the fluid inflow passage 164 and the sensor membrane 112, the sensor membrane 112 will relax toward its rest position and away from the sensor strip 118 at the location at which the object 150 is located. In this manner, the pressure sensor 110 of the invention senses a pressure profile exerted on the sensor membrane 112.

In such an arrangement, the pressure sensor 110 does not directly measure the magnitude of pressure, but rather measures simply whether a sufficient pressure is or is not applied to the sensor membrane 112 as a result of the object 150 being absent or present between the fluid inflow passage 164 and the sensor membrane 112. In contrast, a separate and distinct, but not mutually exclusive use, is to use the pressure sensor 110 of the invention to actually measure the magnitude of the pressure exerted on the flexible membrane. For example, the sensor membrane 112 can be provided with resilience capable of resisting movement away from the rest position of the sensor membrane 112 in proportion to the pressure exerted on the sensor membrane 112.

The sensor device 114 used in the pressure sensor arrangement 100 shown in FIGS. 1–3 can effectively determine the position and/or the presence or absence of the object 150 passing through the object passage 156. The sensor device 114 in accordance with this invention does not only measure whether fluid is flowing out of the inflow passage 164 and impacting on the pressure sensor 110. Rather, the sensor device 114 in accordance with the invention also measures the specific position at which the fluid flow impacts upon the pressure sensor 110.

Further, the pressure sensor 110 in accordance with this invention does not simply measure whether an object 150 is present in the object passage 156, based on the flow of fluid through the object passage 156. The sensing arrangement additionally measures the change in position of the object 150 in the object passage 156. Accordingly the pressure sensor 110 of the invention measures the position of the object 150 in both space and time.

As shown in FIG. 2, an object 150 is positioned in the object passage. If the object 150 enters the object passage 156 on the right side, as shown in FIG. 2, and continues to travel to the left, the object 150 will eventually arrive at the position shown in FIG. 2. As the object 150 approaches the left side of the sensing area 134, the presence of the object 150 will result in diminished fluid flow impacting on the left side of the sensing area 134 of the sensor membrane 112. As a result, the sensor membrane 112 will separate from the sensor strip 118. As the object 150 continues travel toward the left, the contact point 148, i.e., the left most point at which the sensor membrane 112 contacts the sensor strip 118 will generally coincide with the trailing edge of the object 150. The contact point 148 is determinable by the voltage drop sensed by the electrical sensor 122.

As described above, for example, the sensing arrangement shown in FIGS. 1–3, may be used to detect a sheet of paper as in the pressure sensor arrangement 100 shown in FIGS. 1–3. As described above, an object 150 disrupts the fluid flow from the fluid flow source 152, across the object passage 156, and onto the pressure sensor 110 and correspondingly changes the condition of contact of the sensor membrane 112 on the sensor strip 118 comprising the conductive strip 126 and the resistive strip 124. This arrangement may be used to infer the edge position of the object 150, such as an edge position of a sheet of paper. The portion of the paper sheet detected may be the leading edge, the trailing edge, or one or both side edges of the paper sheet. It should be recognized that commercially available paper may have irregular edges. However, the adverse effects of irregular edges of paper sheets may be reduced by measuring the same edge of the paper sheet, or more precisely, the same point on the paper sheet.

The pressure sensors 110 of the invention may be arranged in various manners including one and two-dimensional arrays of the pressure sensors 110. In such arrays, a single electrical source or multiple electrical sources may be used. The electrical sources may be current sources or voltage sources, for example. Further, a plurality of the sensor strips 118 may be arranged in a wide variety of arrangements. For example, a plurality of the sensor strips 118, each including a conductive strip 126 and a resistive strip 124, may be arranged in parallel to each other and extending along a single sensing channel 116. Alternatively, a plurality of sensor strips may be arranged at right angles, or some other angle, relative to each other.

Additionally, for example, each sensor strip 118, extending from a floating end 127 to a ground end 125, may be arranged to only extend along a portion of the length of the sensing channel 116. The sensor strips 118 may be arranged such that the floating end 127 of a first sensor strip 118 is adjacent the ground end 125 of a second sensor strip 118. Further, the floating end 127 of a second sensor strip 118 is adjacent the ground end 125 of a third sensor strip 118, and so forth. The floating end 127 of each respective conductive strip 126 may be attached to a respective current source 120, while the ground end 125 of each respective resistive strip 124 may be attached to a respective electrical sensor 122.

As a result, such a plurality of the sensor strips 118 of the invention may be utilized to measure the position in space and time of an object 150 or objects positioned in an object passage 156 along the entire length of the sensing area 134 corresponding to the sensing channel 116. Further, such a plurality of sensor strips 118 may be used to obtain multiple readings of an object's position and/or presence or absence, such as multiple readings of the object's edge locations at multiple times.

Further, two or more sensor devices 14, each including a sensor strip 118, may be positioned in a single sensing channel 116 such that the sensor strips 118 are laterally spaced along the width of the sensing channel 116, the sensor strips 118 are arranged in parallel to each other, and the sensor strips 118 extend along the same portion of the length of the sensing channel 116. Such an arrangement allows the position and location of an object to be more closely monitored. Illustratively, an undesirable condition may result in the condition that a paper sheet in the object passage 156 is rotated such that either a leading edge or a trailing edge of the paper sheet is out of perpendicular with the length of the object passage 156. Such an arrangement of sensor strips 118 would allow this undesirable rotation of the paper sheet in the object channel to be monitored and corrected in a closed-loop fashion, since the one side of the paper sheet would trail the other side as a result of the rotation.

FIGS. 4–6 show a further embodiment of the pressure sensor according to this invention. The pressure sensor arrangement 200 shown in FIGS. 4–6 includes a pressure sensor 210. The pressure sensor 210 includes a sensor membrane 212 and a sensor device 214. The sensor device 214 includes a sensor strip 218, a voltage source 220, and an electrical sensor 222. The sensor membrane 212 is spaced from the sensor strip 218 and variably contacts and interacts with the sensor strip 218 in a manner that is similar as that discussed with respect to the embodiment shown in FIG. 7. However, in contrast to the embodiment shown in FIGS. 1–3 and 7–10, the sensor strip 218 does not include a conductive strip 226. Rather, the sensor strip 218 includes only a resistive strip 224. As shown in FIG. 4, the voltage source 220 is connected to the resistive strip 224. The resistive strip 224 and the sensor membrane 212 act as a simple potentiometer.

Illustratively, current will be provided to the resistive strip 224 from the voltage source 220 at a current supply point 225 on the resistive strip 224. The current will travel to the end 229 of the resistive strip 224. At the end 229, the current will pass to the electrical sensor 222. The sensor membrane 212 will be in contact with the resistive strip along a portion of the length of the resistive strip 224. Along this portion of the resistive strip, the current will be conducted through the low resistance sensor membrane 212, rather than passing through the higher resistance resistive strip 224. However, toward the ends 227 and 229 of the resistive strip 224, for example, the current will necessarily pass through the resistive strip 224 resulting in a voltage drop similar to the embodiment described above with respect to FIGS. 1–3.

Based on the voltage drop, the electrical sensor 222 may determine the specific point at which the sensor membrane 212 contacts the resistive strip 224. Since the specific point at which the sensor membrane 212 contacts the resistive strip 224 is indicative of the position of the object 150, the position of the object 150 may be determined.

FIGS. 4 and 5 show a particular construct of the electrical sensor 222. However, it is not necessary that this embodiment, or the embodiments described herein, have a particular electrical sensor. Rather, a wide variety of electrical sensors known in the art may be used in embodiments of the invention.

As described above, FIGS. 4–6 show an embodiment of the pressure sensor of the invention that includes a voltage source. However, it should be recognized that in any embodiment of the pressure sensor of the invention, a voltage source may be used in lieu of a current source, or alternatively, a current source may be used in lieu of a voltage source.

Further, it should be recognized that while the object 150 may be preferably vertically centered between the exit end of the inflow passage 264 and the pressure sensor 210, such positioning is not necessary. The pressure sensor arrangement 200 may be effectively operated when the object 150 is positioned closer to the pressure sensor 210, or alternatively closer to the exit end of the inflow passage 264. However, if the distance between the fluid flow source 252 and both the sensed object 150 and the pressure sensor 210 is substantial, broadening out of the fluid flow generated by the fluid flow source 252 may occur. Such broadening out of the fluid flow would effect the resolution of the pressure sensor arrangement 200 since the point of impact of the fluid flow upon the sensor membrane 212 might not accurately reflect the position of an object 150 in the object passage 256.

Figure 11:
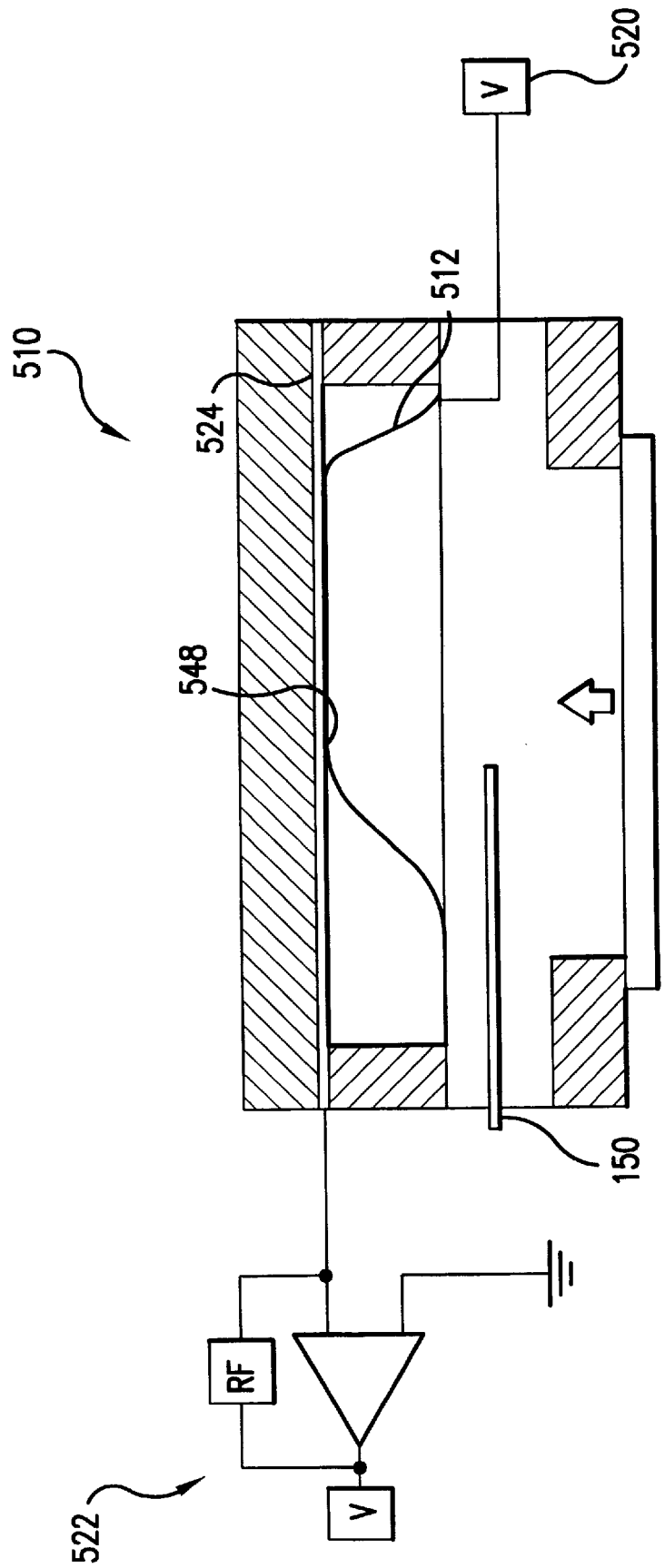
FIG. 11 is a top plan view of a pressure sensor in accordance with a further embodiment of this invention.

FIG. 11 shows another embodiment of a pressure sensor 510 according to the invention. The voltage source 520 is not connected to the resistive strip 524. Rather, the voltage source 520 is directly connected to the sensor membrane 512. Thus, the sensor membrane 512 will be electrified. The resistive strip has a resistance R along its entire length. In operation, the electrical current will pass through the sensor membrane 512 as far to the left, for example, as it can to reach the input terminal of the electrical sensor 522. However, at a separation point 548, i.e., where the sensor membrane 512 separates from the resistive strip 524, the current will necessarily pass into the resistive strip 524 and flow to the left into the electrical sensor 522. Similar to the embodiments discussed above, the position of the object 150 can be thus be determined using the electrical sensor 522.

The specific materials and dimensions of the pressure sensor in accordance with the invention, as shown, for example, in FIGS. 1–11 will vary depending on the specific application of the pressure sensor. Further, the design of the pressure sensor including the minimum sizes of the sensor membrane and the sensor device comprising one or a plurality of sensor strips, will depend on the specifics of the fabrication technology utilized.

While this invention has been described in conjunction with specific embodiments outlined above, it is evident that many alternative, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An apparatus that senses an edge pressure profile generated by an edge of a pressure source, comprising:

at least one sensor strip having at least a resistive strip;

at least one electrical source connected to the sensor strip;

a conductive sensor membrane extending adjacent to and spaced from the sensor strip; and at least one electrical sensor connected to the resistive strip;

wherein, when an edge pressure is applied to the sensor membrane, the sensor membrane is deformed to electrically contact the sensor strip.

2. The apparatus according to claim 1, wherein the sensor strip comprises a resistive strip and a conductive strip.

3. The apparatus according to claim 2, wherein:

the resistive strip has a first end and a second end opposing the first end;

the conductive strip has a first end and a second end opposing the first end of the conductive strip; and the conductive strip is positioned parallel to the resistive strip.

4. The apparatus according to claim 3, wherein the at least one electrical source is at least one current source.

5. The apparatus according to claim 4, wherein:

the at least one electrical sensor is an electrical amplifier having first and second input terminals and an output terminal;

the conductive strip is connected to the first input terminal and the resistive strip is connected to the second input terminal; and the current source is connected to the conductive strip.

6. The apparatus according to claim 4, wherein the at least one electrical sensor comprises a first electrical amplifier and a second electrical amplifier, each of the first electrical amplifier and the second electrical amplifier connected to the resistive strip.

7. The apparatus according to claim 6, wherein:

each of the first electrical amplifier and second electrical amplifier comprises a first input terminal, a second input terminal and an output terminal;

a first end of the conductive strip is connected to the first input terminal of the first amplifier and a first end of the resistive strip connected to the second terminal of the first amplifier; and a second end of the conductive strip is connected to the first input terminal of the second amplifier and a second end of the resistive strip is connected to the second terminal of the second amplifier.

8. The apparatus according to claim 7, wherein the conductive strip has a central portion along a length of the conductive strip, the central portion of the conductive strip connected to ground.

9. The apparatus according to claim 8, wherein a first current source is connected to the second terminal of the first amplifier and a second current source is connected to the second terminal of the second amplifier.

10. The apparatus according to claim 2, wherein the electrical source is a voltage source.

11. The apparatus according to claim 10, wherein the at least one electrical sensor is an electrical amplifier having first and second input terminals and an output terminal, the resistive strip is connected to the second input terminal, and the first input terminal is connected to ground.

12. The apparatus according to claim 11, wherein the voltage source is connected to the conductive strip.

13. The apparatus according to claim 1, wherein the electrical source is connected to the resistive strip.

14. The apparatus according to claim 1, wherein the electrical source is connected to the sensor membrane.

15. The apparatus according to claim 1, wherein the edge pressure profile is generated by a fluid flow source.

16. The apparatus according to claim 1, further comprising:

a housing; and a sensing channel within the housing, the sensing channel defining a sensing space, the sensor strip extending along at least a portion of the sensing channel within the sensing space.

17. The apparatus according to claim 16, wherein the sensor membrane is disposed to form one wall of the sensing channel, the sensor membrane being deformable into the sensing space of the sensing channel.

18. The apparatus according to claim 1, wherein the at least one sensor strip comprises a first sensor strip and a second sensor strip.

19. The apparatus according to claim 18, wherein the first sensor strip is parallel to the second sensor strip.

20. The apparatus according to claim 18, wherein the first sensor strip is at a non-zero angle to the second sensor strip.

21. A photocopy device including the apparatus that senses at least one of a presence, an absence or a magnitude of pressure of claim 1.

22. A printer device including the apparatus that senses at least one of a presence, an absence or a magnitude of pressure of claim 1.

23. A facsimile machine including the apparatus that senses at least one of a presence, an absence or a magnitude of pressure of claim 1.

24. A document handler including the apparatus that senses at least one of a presence, an absence or a magnitude of pressure of claim 1.

25. A paper making machine including the apparatus that senses at least one of a presence, an absence or a magnitude of pressure of claim 1.

26. A sheet metal rolling machine including the apparatus that senses at least one of a presence, an absence or a magnitude of pressure of claim 1.

27. A conveyor system including the apparatus that senses at least one of a presence, an absence or a magnitude of pressure of claim 1.

28. A materials transport system including the apparatus that senses at least one of a presence, an absence or a magnitude of pressure of claim 1.

* * * * *